United States Patent

[15] 3,663,334

Mueller-Tamm et al.

[45] May 16, 1972

[54] LAMINATING METAL TO POLYOLEFIN WITH AN ORGANIC PEROXIDE AND A TERPOLYMER OF ETHYLENE, T-BUTYL ACRYLATE AND ACRYLIC ACID

[72] Inventors: Heinz Mueller-Tamm, Ludwigshafen; Alfred Hofmann, Roxheim, both of Germany

[73] Assignee: Badische Anilin- & Soda-Fabrik Aktiengesellschaft, Ludwigshafen am Rhine, Germany

[22] Filed: May 19, 1969

[21] Appl. No.: 825,978

[30] Foreign Application Priority Data

May 22, 1968 Germany ......................P 17 69 422.3

[52] U.S. Cl. ..............................156/309, 156/332, 156/334, 161/218

[51] Int. Cl. ........................C09j 3/14, C09j 5/06, C09j 7/00

[58] Field of Search .................156/309, 332, 334; 260/80.8, 260/80.81; 161/218

[56] References Cited

UNITED STATES PATENTS

| | | | |
|---|---|---|---|
| 3,249,570 | 5/1966 | Potts et al. | 260/80.8 X |
| 3,481,812 | 12/1969 | Holub et al. | 156/306 |

*Primary Examiner*—Carl D. Quarforth
*Assistant Examiner*—E. A. Miller
*Attorney*—Johnston, Root, O'Keefe, Keil, Thompson and Shurtleff

[57] ABSTRACT

A process for bonding or laminating materials by means of terpolymers of ethylene, an ethylenically unsaturated carboxylic acid and an ester of an ethylenically unsaturated carboxylic acid. It is a characteristic of the process that the terpolymers are used with an addition of an organic peroxide having the general formula $R^1—O—O—R^2$ or $R^1—O—O—X—O—O—R^2$ in which $R^1$ and $R^2$ denote hydrogen atoms or alkyl, aryl, aralkyl, alkaryl or acyl radicals and X denotes an aliphatic, aromatic, aromatic-aliphatic or aliphatic-aromatic radical.

3 Claims, No Drawings

LAMINATING METAL TO POLYOLEFIN WITH AN ORGANIC PEROXIDE AND A TERPOLYMER OF ETHYLENE, T-BUTYL ACRYLATE AND ACRYLIC ACID

The present invention relates to a process for bonding or laminating materials using an olefin polymer having carboxyl groups as the bonding or laminating agent, the materials being bonded or laminated at elevated temperature and if desired at superatmospheric pressure with melting of the olefin polymer.

In prior art methods of this type, binary polymers which contain polymerized units of ethylene and an ethylenically unsaturated carboxylic acid are generally used as the olefin polymers.

A certain disadvantage in the use of such binary polymers lies in the fact that their adhesion in a number of cases, for example to metals, leaves much to be desired, especially upon prolonged action of water or moisture.

An invention conceived but not published prior to the present invention relates to a process of the abovementioned type which does not have the disadvantage indicated above. In the process according to the previously conceived invention, a special ternary copolymer (terpolymer) is used as the olefin polymer which contains not only polymerized units of ethylene and an ethylenically unsaturated carboxylic acid, but also an ester of an ethylenically unsaturated carboxylic acid.

The subject matter of the previously conceived invention is accordingly a process for bonding or laminating materials using an olefin polymer having carboxyl groups as the bonding or laminating agent, the materials being bonded or laminated at elevated temperature and at atmospheric or superatmospheric pressure while melting the olefin polymer. The process of the previously conceived invention comprises using as the olefin polymer a terpolymer prepared from 60 to 90 parts by weight of ethylene, 0.5 to 20 parts by weight of an ethylenically unsaturated carboxylic acid and 0.5 to 20 parts by weight of an ester of an ethylenically unsaturated carboxylic acid, the sum of the parts by weight being 100 in each case.

An advantageous embodiment of the process of the previously conceived invention comprises using as the olefin polymer a terpolymer prepared from 71 to 90 parts by weight of ethylene, 3 to 9 parts by weight of an aliphatic, ethylenically unsaturated $C_3$ to $C_5$ carboxylic acid and 1 to 20 parts by weight of a $C_1$ to $C_8$ alkyl ester of an aliphatic, ethylenically unsaturated $C_3$ to $C_5$ carboxylic acid, the sum of the parts by weight being 100 in each case.

A particularly advantageous embodiment of the process of the previously conceived invention comprises using as the olefin polymer a terpolymer prepared from 71 to 90 parts by weight of ethylene, 3 to 9 parts by weight of acrylic acid and 1 to 20 parts by weight of tertiary-butyl acrylate, the sum of the parts by weight being 100 in each case.

Moreover, when using the process of the previously conceived invention it is advantageous for the terpolymer used to have the following characteristic data:

| | |
|---|---|
| density: | 0.9 to 1.1 g/cm$^3$; |
| crystalline fraction: | less than 60%; |
| melting range: | within the limits 70° to 120°C; |
| Shore hardness C: | 50 to 90. |

The object of the present invention is to provide an improvement in the process of the said previously conceived invention, particularly in its advantageous embodiments. In particular, bonds or laminations should be obtained which have an increased resistance to high temperatures and also more favorable creep rupture strength values when subjected to tensile and shear stress at elevated temperatures.

The said improvement is achieved in accordance with this invention by using the terpolymer with an addition of a specially selected organic peroxide.

The present invention accordingly consists in a process for bonding or laminating materials using an olefin polymer having carboxyl groups as the bonding or laminating agent, the bonding or laminating of the materials being carried out at elevated temperature and at atmospheric or superatmospheric pressure while melting the olefin polymer and the olefin polymer used being a terpolymer prepared from 60 to 90 parts by weight of ethylene, 0.5 to 20 parts by weight of an ethylenically unsaturated carboxylic acid and 0.5 to 20 parts by weight of an ester of an ethylenically unsaturated carboxylic acid, the sum of the parts by weight being 100 in each case, wherein the terpolymer is used with an addition of 0.05 to 7 percent by weight (with reference to the weight of the terpolymer) of an organic peroxide having the general formula $R^1—O—O—R^2$ or $R^1—O—O—X—O—O—R^2$ in which $R^1$ and $R^2$ each stands for a hydrogen atom or an alkyl, aryl, aralkyl, alkaryl or acyl having in each case up to fourteen carbon atoms and X denotes an aliphatic, aromatic, aromatic-aliphatic or aliphatic-aromatic radical having in each case up to fourteen carbon atoms, with the proviso that the peroxide should contain a total of at least six carbon atoms.

The terpolymers to be used in the course of the process according to this invention are known as such so that no further description of them need be given.

The peroxides the use of which is an essential of the process according to the present invention are also known as such. Examples of suitable peroxides are: di-α-cumyl peroxide, 1,3-bis-(tertiary-butylperoxyisopropyl)-benzene, hydroxyheptyl peroxide, 2,5-dimethylhexyl,2,5-di-(peroxy benzoate), di-tertiary-butyl diperphthalate, 2,5-dimethyl-2,5-di-(tertiary-butylperoxy)-hexyene-3 and 2,5-dimethylhexyl-2,5-dihydroperoxide.

The terpolymers are used together with the peroxides. The latter are present in amounts of from 0.05 to 7 percent, preferably from 0.5 to 3 percent, by weight with reference to the terpolymer. The combination of terpolymer and peroxide may take the form of a mixture of terpolymer powder and peroxide powder, or of terpolymer powder to which the peroxide has been applied in liquid or dissolved phase, or of solutions containing both the terpolymer and the peroxide dissolved therein. For a number of applications it is advantageous for the combinations of terpolymer and peroxide to be in the form of sections or of sheeting or film; they may be used for example as hot-melt adhesives. Appropriate sections, sheeting or film may be prepared by conventional methods, for example from granules of terpolymer to which the peroxide has been applied (for example from a solution by evaporating the solvent) by means of a conventional extruder or equipment provided with a flat sheeting die. In this case the peroxides used should not decompose to an appreciable extent at the temperature prevailing during the extrusion.

The process according to this invention is especially suitable for bonding or laminating metals, polyolefins, polyamides and wood, particularly when they are in the form of sheet-like structures.

A considerable advantage of the process according to this invention is that when metals are to be bonded or laminated the conventional measures of pretreatment can be dispensed with; only cleaning may be called for. Degreasing, mechanical roughening or oxidative-chemical pretreatment, for example in baths containing chromic acid and phosphoric acid, is not necessary. Even in the case of polyolefins, irradiation or oxidizing pretreatment can be dispensed with.

The process according to this invention can be carried out by conventional methods with conventional plant; the operating temperature (the temperature of the terpolymer used) should generally not exceed about 240° C.

The process according to this invention is of great interest for example for the production of sandwich structures consisting of layers of metal and polyolefins. Such sandwich structures combine low specific gravity and high rigidity. They are suitable for the production of body parts in motor car construction, and of linings and walls in building construction, shipbuilding, aircraft construction and container construction. Such sandwich structures may also be used for acoustic and thermal insulation, for example when the internal layer contains fillers such as mica (for acoustic insulation) or porous material (for thermal insulation). The process according to this invention is also of importance in the bonding of metals as well as in the bonding and laminating of for example textiles, fabrics, rubber, leather, paper and glass.

The invention is illustrated by the following Examples.

EXAMPLE 1

A board of polyethylene (density 0.918 g/cm$^3$, MFI 190/2, 1.2 g/10 minutes) having a thickness of 4 mm is extruded at a temperature of from 180°to 250° C. on extrusion equipment provided with a slot die 600 mm in width. This board is combined on both sides with a film F having a thickness of 100 millimicrons and at the same time on both sides with an aluminum foil of high elongation which is 0.3 mm in thickness by means of a pair of rollers heated to 170° C. The film F consists of a terpolymer prepared from 88 parts by weight of ethylene, 9.3 parts by weight of tertiary-butyl acrylate and 2.7 parts by weight of acrylic acid and containing 2 percent by weight of di-$\alpha$-cumyl peroxide. The composition of the resultant sandwich board is as follows: aluminum/terpolymer/poly ethylene/terpolymer/aluminum. While still hot the board passes through two pairs of heated rollers and one pair of cooled rollers. Sandwich units of low specific gravity and high rigidity are obtained.

EXAMPLE 2

A plywood board having a thickness of 5 mm is coated first with a film F having a thickness of 200 millimicrons and then with aluminum foil having a thickness of 0.5 mm. The film F consists of a terpolymer having a melt index of 7.4 and prepared from 89.9 parts by weight of ethylene, 4.0 parts by weight of acrylic acid and 6.2 parts by weight of tertiary-butyl acrylate; the terpolymer contains 1.5 percent by weight of 1,3 -bis-(tertiary-butylperoxy-isopropyl)-benzene. The resulting ply formation is pressed for 4 minutes at 180° C. at a ram pressure of 200 atmospheres. The composite board obtained is suitable for many applications in building construction and in the furniture industry.

The wooden board may be laminated in the same way with veneer wood instead of with aluminum foil.

We claim:

1. A process for laminating together a sheet of metal and a sheet of polyolefin, which comprises applying, as a hot melt adhesive, between plies of said sheets a film of a mixture of (a) a terpolymer of from 60 to 90 parts by weight of ethylene, 0.5 to 20 parts by weight of acrylic acid and 0.5 to 20 parts by weight of tertiary butyl acrylate, the sum of the parts by weight being 100, and of from 0.05 to 7 percent by weight, with reference to the terpolymer, (b) an organic peroxide having the general formula $R^1—O—O—R^2$ or $R^1—O—O—X—O—O—R^2$ in which $R^1$ and $R^2$ each denotes a hydrogen atom or an alkyl, aryl, aralkyl, alkaryl or acyl radical having in each case up to 14 carbon atoms and X denotes an aliphatic, aromatic, aromatic-aliphatic or aliphatic-aromatic radical having in each case up to 14 carbon atoms, with the proviso that the peroxide contains a total of at least six carbon atoms, pressing the laminated sheets together with the application of heat sufficient to make the terpolymer molten, the temperature of the terpolymer being up to about 240°C, and cooling the composite to obtain a bonded composite of said laminated sheets.

2. A process as claimed in claim 1 wherein the terpolymer used is one prepared from 71 to 90 parts by weight of ethylene, 3 to 9 parts by weight of acrylic acid and 1 to 20 parts by weight of tertiary-butyl acrylate, the sum of the parts by weight being 100.

3. A process as claimed in claim 2, said sheet of metal being aluminum foil.

* * * * *